April 3, 1956 H. S. SAYRE 2,740,671
PULVERULENT MATERIAL SUPPLY FOR VOLUMETRIC FEEDERS
Filed May 22, 1953
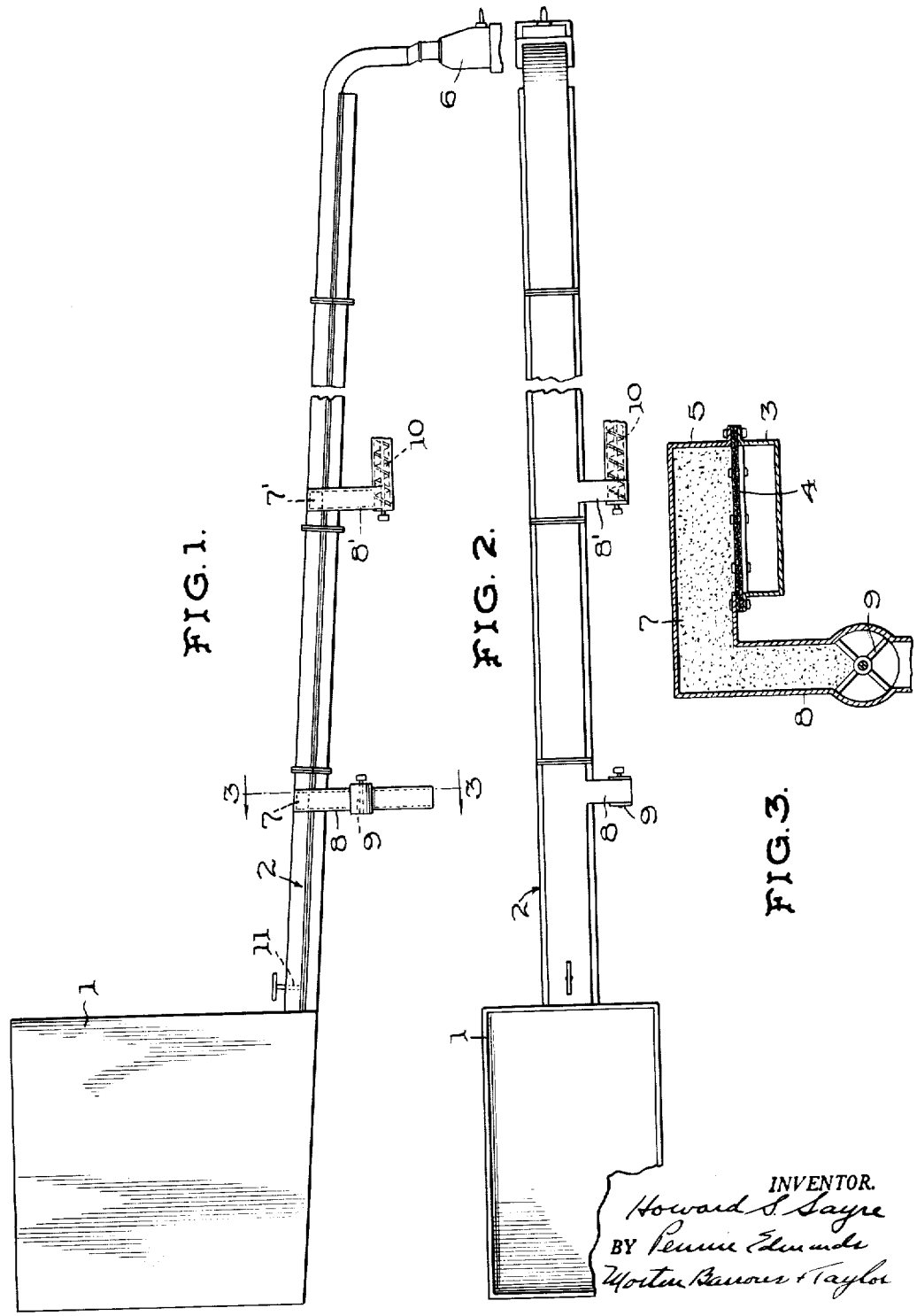
INVENTOR.
Howard S Sayre
BY
ATTORNEYS

United States Patent Office 2,740,671
Patented Apr. 3, 1956

2,740,671

PULVERULENT MATERIAL SUPPLY FOR VOLUMETRIC FEEDERS

Howard Stuart Sayre, Bethlehem, Pa., assignor to Fuller Company, Catasauqua, Pa., a corporation of Delaware Application May 22, 1953, Serial No. 356,747

3 Claims. (Cl. 302—29)

This invention relates to the supplying of pulverulent material to volumetric feeders.

Volumetric feeders usually are in the form of screw feeders, rotary feeders and helical conveyors of various types, and are used for many purposes. For example, screw feeders are used for feeding delivered raw material to rotary kilns and for feeding coal to coal burners; helical conveyors of various types are used for feeding materials in the chemical industry; and rotary feeders are used in the feeding mechanisms of packer installations.

As is well known, it is highly desirable that a constant head of constant density be maintained over a volumetric feeder since the delivery from volumetric feeders is quite sensitive to the head of material over the feeder. Various proposals heretofore have been made to maintain such constant head conditions, but as a general rule such proposals involved the use of cumbersome and uneconomical equipment.

It has now been ascertained that a constant head of constant density material may be maintained over a volumetric feeder by the use of air-activated gravity conveyors of the type shown in the patent to Schemm No. 2,527,455. In such conveyors the material is caused to flow along a slightly-inclined, gas-permeable surface while in an aerated state caused by the passage of air of uniform low-pressure upwardly throughout the length of the conveying surface from an underlying plenum chamber.

In the use of the air-activated conveyors of the above types for maintaining a constant head of constant density, the material is supplied to the upper end of the conveying surface from a storage space and is discharged from the conveying surface at the bottom thereof and from lateral takeoffs into bins or containers having volumetric feeders located at the bottom thereof.

Material is supplied to the bin or container above the volumetric feeder in a manner such that the bin or container is kept full at all times. This is accomplished by using an air-activated conveyor of the closed type, that is, one in which the trough for the flow of material above the conveying surface is closed, and having the closed trough connected to and supplied from a storage space containing material in excess of the maximum feeder requirement of all volumetric feeders to be supplied. The conveyor dead-ends at the last volumetric feeder unit in the series, and, during operation, the conveying trough of the conveyor is maintained full of the aerated pulverulent material, except for a narrow space along the top or roof of the trough which is necessary for venting the air which is continuously passed through the gas-permeable conveying surface for the purpose of maintaining the overlying material in an aerated state. With such an arrangement, there is always available, for each volumetric feeding unit, any desired amount of feed of the pulverulent material. Also, any one or more of the units may be shut off without in any way affecting the availability or supply of the material to the other units and without the necessity of discontinuing the supply of air to the plenum chamber of the conveyor. While the conveying trough of the conveyor will always be maintained full of the aerated material, that is, as long as the air is supplied to the plenum chamber, there will be no movement of the aerated material along the trough unless one or more of the feeder units are in operation. Such an arrangement is impossible with mechanical conveyors, since as long as such conveyors are operating there must be a flow of material. Such an arrangement also has obvious advantages in the saving in equipment over installations, even if using air-activated gravity conveyors, where an excess of the pulverulent material is supplied at all times to the conveyor, and the excess is discharged into a surge bin at the end of the line from which it is returned to the original storage space.

While the material in the bins or containers above the volumetric feeders may not be of exact uniform density from the top to the bottom, it is fair to consider it as being of constant density since the delivery of the aerated material to the top of the bins or containers remains constant and the de-aeration which takes place in the respective bins during the operation of the volumetric feeders also should be constant.

The storage bin for supplying the air-activated conveyor may be of large capacity and contain sufficient material to operate all of the volumetric feeders for a substantial period of time, or it may be a small surge bin which is fed by an elevator or other continuously-operating means, in which case it is necessary to supply the small bin with material in excess of that which will be required for the maximum number of volumetric feeder units to be supplied, with the excess being returned to the starting point. If such a small type of storage space is used, it may advantageously be supplied with an air-lift type of elevator of the kind disclosed in the patent to Morrow No. 2,509,984.

The invention will be further described in connection with the accompanying drawings, in which Fig. 1 is a side-elevational view of a conveying system constructed in accordance with the invention, Fig. 2 is a plan view of the conveying system shown in Fig. 1, and Fig. 3 is a transverse cross-sectional view on line 3—3 of Fig. 1.

Referring to the drawings, the pulverulent material to be fed to the volumetric feeders is supplied to a storage space or bin 1. This bin may be of large capacity, such as to contain a supply of material to operate all of the volumetric feeders for a substantial period of time, or it may be a smaller storage bin which is fed by continuously or intermittently operating means.

The pulverulent material is fed from the lower end of the storage bin 1 into the upper end of a slightly inclined air-activated conveyor 2 of the type disclosed in the aforesaid Schemm patent. This conveyor comprises an air or plenum chamber 3 into which air from any suitable source may be supplied at the desired pressure. The upper side of the chamber 3 is formed by a gas-permeable material 4, such as tightly-woven multi-ply canvas having a low uniform gas-permeability so that the air from the plenum chamber flows upwardly therethrough at a uniform rate throughout the length thereof. The upper surface of the gas-permeable material forms a conveying surface for the pulverulent material, which is aerated by the air passing upwardly therethrough. The upper conveying surface of the gas-permeable conveying material 4 is enclosed by a housing 5 which, with the material 4, forms a trough through which the aerated pulverulent material flows.

The lower end of the conveyor 2 deadends into a container or bin above a packer mechanism 6 of conventional type having the usual volumetric feeding means.

In addition to feeding pulverulent material to the packer mechanism 6, the conveyor 2 is also adapted to feed pulverulent material to any number of other volumetric feeders. To this end the housing 5 is provided with lateral offtakes 7, 7', etc. terminating in downwardly-extending conduits for bins 8, 8', etc. The conduits 8, 8' supply the pulverulent material from the conveyor 2 to a desired place at a lower level. Each conduit or bin 8, 8' is provided with a volumetric feeder which may be of any type. For example, the volumetric feeder positioned in the downwardly-extending conduit 8 may be a rotary feeder 9, while the volumetric feeder positioned at the bottom of the conduit 8' may be a screw or worm 10. The volumetric feeders 9 and 10 may supply the pulverulent material in predetermined amounts to any type of mechanism.

The amount of material permitted to flow from the storage space 1 into the upper end of the conveyor trough 5 is controlled by an adjustable weir 11.

In operation, pulverulent material is maintained in the storage space or bin 1 at all times and fed therefrom into the upper end of the housing 5 onto the gas-permeable conveying surface 4. As the pulverulent material is fed onto the conveying surface 4, it is aerated by the air passing upwardly therethrough from the air chamber 3 and assumes a fluidized state in which it will flow, as a fluid, downwardly along the conveying surface 4. The material is fed onto the upper end of the conveying surface 4 at a rate sufficient to maintain the housing 5, the various offtake chutes 7, 7' etc. and the downwardly-extending conduits 8, 8' etc. full at all times, except for such slight space along the roof of the housing 5 as may be necessary to permit the air to flow upwardly therealong to be exhausted at the upper end into the storage space 1 from which it passes to the atmosphere. Thus, a constant head of constant density will be maintained over the volumetric feeders of the packer mechanism 6, and also over each of the volumetric feeders 9 and 10; and that condition will exist even though operation of any of the volumetric feeders may be discontinued for any reason whatsoever, as long as the supply of air is maintained to the air chamber 3. Consequently, the respective volumetric feeders will operate to more effectively deliver a predetermined volume of material to the packer mechanism 6 and any other mechanisms to which they control the supply of material.

Various changes may be made in details of the construction of the mechanism disclosed, and in the method of operation without sacrificing any of the advantages of the invention.

I claim:

1. The method of supplying pulverulent material from a source of supply to a desired place at a uniform volumetric rate which comprises passing said pulverulent material from said source of supply in a slightly inclined direction through a conveying trough, aerating said pulverulent material while it is passing through said trough, withdrawing a portion of the fluidized pulverulent material from said trough and passing it downwardly through a delivery conduit to said desired place, volumetrically controlling the amount of withdrawn pulverulent material passing through said delivery conduit at a place intermediate the levels of said desired place and the point of withdrawal of the pulverulent material from said trough, the amount of material withdrawn from said trough and passed through said delivery conduit being so correlated to the capacity of the volumetric control means that a substantially uniform head of the withdrawn material is maintained above said volumetric control means.

2. The method of claim 1 in which the material is supplied to said conveying trough at a rate sufficient to maintain it substantially full at all times.

3. The method of claim 2 in which the pulverulent material is withdrawn from the conveying trough and passed downwardly to desired places both from the end thereof and from a side thereof, and the flow of all material withdrawn from the conveying trough is volumetrically controlled.

References Cited in the file of this patent

UNITED STATES PATENTS

| 1,616,547 | Pontoppidan | Feb. 8, 1927 |
| 1,796,215 | Peikert | Mar. 10, 1931 |
| 2,011,133 | Yoss | Aug. 13, 1935 |
| 2,509,984 | Morrow | May 30, 1950 |
| 2,527,394 | Browne | Oct. 24, 1950 |
| 2,527,455 | Schemm | Oct. 24, 1950 |
| 2,681,748 | Weller | June 22, 1954 |